(12) United States Patent
Bridgwater et al.

(10) Patent No.: US 7,625,532 B2
(45) Date of Patent: Dec. 1, 2009

(54) ABLATIVE THERMOLYSIS REACTOR

(75) Inventors: Anthony Victor Bridgwater, Solihull (GB); George Vernon Cordner Peacocke, Belfast (GB); Nicholas Matthew Robinson, Redditch (GB)

(73) Assignee: Aston University, Birmingham (GB)

( * ) Notice: Subject to any disclaimer, the term of this patent is extended or adjusted under 35 U.S.C. 154(b) by 843 days.

(21) Appl. No.: 10/501,025

(22) PCT Filed: Jan. 10, 2003

(86) PCT No.: PCT/GB03/00070

§ 371 (c)(1),
(2), (4) Date: Apr. 8, 2005

(87) PCT Pub. No.: WO03/057800

PCT Pub. Date: Jul. 17, 2003

(65) Prior Publication Data

US 2005/0173237 A1    Aug. 11, 2005

(30) Foreign Application Priority Data

Jan. 10, 2002    (GB) .................. 0200476.0

(51) Int. Cl.
*B01J 19/00*    (2006.01)
*B01J 8/02*    (2006.01)
*B01J 35/02*    (2006.01)
*C10B 51/00*    (2006.01)
*C10B 7/14*    (2006.01)
*C10B 49/00*    (2006.01)

(52) U.S. Cl. .................. 422/198; 422/209; 422/210; 422/211; 422/204; 202/96; 202/99; 202/100; 366/197; 366/241; 366/244; 366/245; 366/265; 366/326.1; 366/329.3; 209/722

(58) Field of Classification Search ............. 422/198, 422/209, 210, 204, 211; 202/100, 96, 99; 209/722; 366/197, 241, 244, 245, 265, 326.1, 366/329.3
See application file for complete search history.

(56) References Cited

U.S. PATENT DOCUMENTS 3,883,616 A * 5/1975 Hozumi et al. .............. 525/243

(Continued)

FOREIGN PATENT DOCUMENTS

| DE | 3407236 | 9/1985 |
| JP | 11216444 | 8/1999 |
| JP | 2000290660 A * | 10/2000 |

OTHER PUBLICATIONS

Translation of JP 2000-290660 A.*
Translation of JP 11-216444.*

(Continued)

*Primary Examiner*—Walter D Griffin
*Assistant Examiner*—Natasha Young
(74) *Attorney, Agent, or Firm*—Michael Best & Friedrich LLP

(57) ABSTRACT

The present invention relates to an ablative thermolysis reactor (12) comprising a reaction vessel (20), and inlet (14) into the reaction vessel (20) for receiving feedstock, and an outlet from the reaction vessel (20) for discharging thermolysis product. Within the reaction vessel (20), is provided an ablative surface (20a) defining the periphery of a cylinder, and heating means (22) are arranged to heat the ablative surface (20a) to an elevated temperature. In addition at least one rotatable surface (28) having an axis of rotation coincident with the longitudinal axis of said cylinder. The rotatable surface (28) is provided relative to the ablative surface (20a) such that feedstock is pressed between a part of the rotatable surface (28) and said ablative surface (20a) and moved along the ablative surface (20a) by the rotatable surface (28), whereby to thermolyse said feedstock.

12 Claims, 3 Drawing Sheets

U.S. PATENT DOCUMENTS

| | | | | |
|---|---|---|---|---|
| 4,308,103 | A | * | 12/1981 | Rotter ......................... 202/117 |
| 4,374,704 | A | * | 2/1983 | Young ......................... 202/117 |
| 5,413,227 | A | * | 5/1995 | Diebold et al. .............. 209/722 |
| 5,424,039 | A | * | 6/1995 | Hiral ........................... 422/186 |
| 5,586,396 | A | * | 12/1996 | Kanai ............................. 34/59 |
| 6,379,629 | B1 | * | 4/2002 | Kanai ........................... 422/204 |
| 6,830,597 | B1 | * | 12/2004 | Green ........................... 48/209 |

OTHER PUBLICATIONS

Machine translation of DE3407236 A1.*

Peacocke G V C et al. "Ablative Plate Pyrolysis of Biomass for Liquids" Biomass and Bioenergy, Pergamon, Oxford, GB, vol. 7, No. 1-6, 1994, pp. 147-154 XP008015226 ISSN: 0961-0534.

Bridgewater A V et al. "Fast Pyrolysis Processes for Biomass" Renewable and Sustainable Energy Reviews, Elseviers Science, New York, NY, US, vol. 4, No. 1, Mar. 2000, pp. 1-73 XP004268416 ISSN: 1364-0321.

International Search Report for Application No. PCT/GB03/00070 dated May 8, 2003 (3 pages).

* cited by examiner

ABLATIVE THERMOLYSIS REACTOR

CROSS-REFERENCE TO RELATED APPLICATIONS

This patent application is a national stage filing under 35 U.S.C. 371 of International Application No. PCT/GB03/00070, filed Jan. 10, 2003, which claims foreign priority benefits to United Kingdom Application No. 0200476.0, filed Jan. 10, 2002, both of which are incorporated herein by reference.

This invention relates to a thermolysis reactor, particularly but not exclusively, to a thermolysis reactor for the pyrolysis of a solid feedstock into a liquid useful, for example, as a fuel, or as a source of chemicals, or for the production of chemicals and/or derived products.

A liquid can be produced from high temperature processing of a solid feedstock (such as wood or other organic based material such as agricultural waste) in a process known as fast or flash pyrolysis or thermolysis. Most pyrolysis processes utilize heat transfer from a hot gas and/or hot solid, such as sand, to the feedstock and rely on the particles of feedstock being small to achieve rapid heating. This process is typically performed in entrained flow, transported, fluid or circulating beds. A further process by which feedstock can be pyrolyzed is ablative pyrolysis. Ablative pyrolysis is the process of applying high-applied mechanical pressure or centrifugal force to particles of feedstock which are moved on a hot surface. This process has the advantages that heat transfer is more effective, the use of inert or transport gas can be minimized, and much larger particles of feedstock can be used than is typically used in fluid or circulatory beds.

Figure 1:
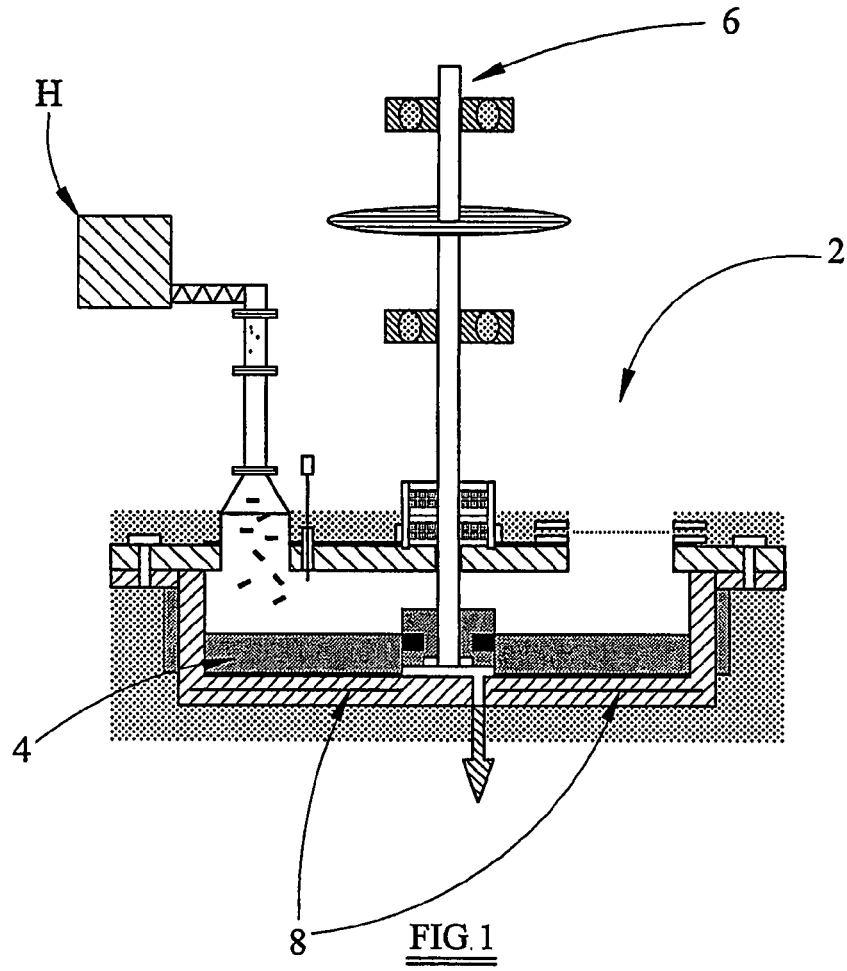
Figure 2:
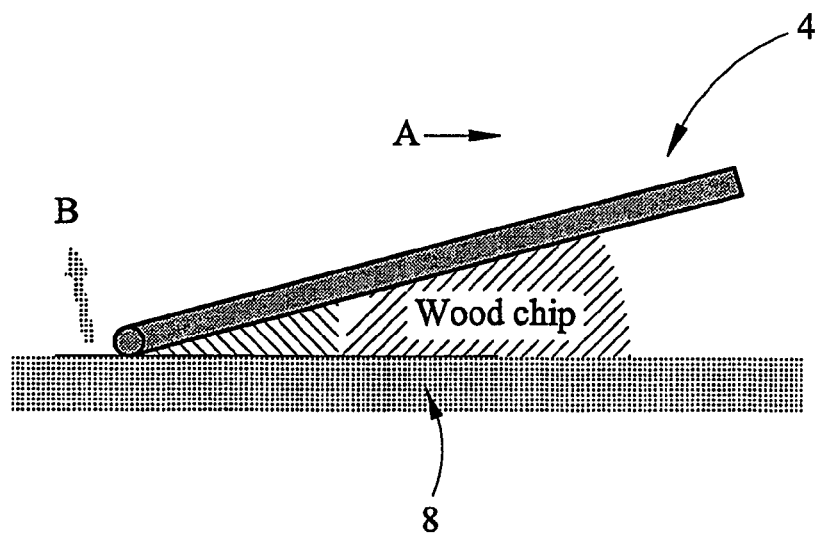

A number of different types of apparatus for performing ablative pyrolysis are known, such as that disclosed in the document "Ablative Plate Pyrolysis of Biomass for Liquids" (Peacocke G V C, Bridgwater A V, (1994) Biomass and Bioenergy. 7 (1-6) p 147-154). Referring to FIG. 1, this document discloses an ablative pyrolysis reactor 2 having a number of adjustable, rotating asymmetric blades 4 connected to a central drive shaft 6. The blades 4 rotate at a predetermined distance from an ablative surface 8. The ablative surface 8 is a flat, circular plate which, in use, is heated to approximately 600° C. In use, feedstock (e.g. wood chip) is continuously fed into the reactor 2 from a sealed hopper (H). The wood chip falls onto the ablative surface 8 above which the blades 4 rotate (direction of rotation indicated by arrow A): The wood chip particles are trapped by the blades 4 which are angled as shown in FIG. 2, and moved against the heated ablative surface 8 where they are pyrolysed. Hot gases are produced (arrow B) which are then cooled, collected and condensed to give a liquid.

The above described apparatus is difficult to operate effectively, particularly on a large scale, such as would be required in a viable commercial process. Control of longer blades is difficult due to distortion or "flapping" which reduces the effectiveness of the process. In addition contact between the blades and the ablative surface can occur resulting in the blades or the surface being damaged.

It is an object of the present invention to obviate or mitigate the above disadvantages by providing an improved ablative thermolysis reactor.

According to the present invention there is provided an ablative thermolysis reactor comprising:
(i) a reaction vessel,
(ii) an inlet into the reaction vessel for receiving feedstock,
(iii) an outlet from the reaction vessel for discharging thermolysis product,
(iv) within the reaction vessel, an ablative surface defining the periphery of a cylinder,
(v) heating means arranged to heat said ablative surface to an elevated temperature, and
(vi) at least one rotatable surface, the or each rotatable surface having an axis of rotation coincident with the longitudinal axis of said cylinder, wherein the rotatable surface is positioned relative to the ablative surface such that feedstock is pressed between a part of the rotatable surface and said ablative surface and moved along the ablative surface by the rotatable surface, whereby to thermolyse said feedstock.

The ablative surface may be concave or convex. Preferably, the reaction vessel is bounded by an inner or an outer peripheral wall with the ablative surface being defined by an inwardly facing surface of said outer wall (i.e. concave ablative surface), or an outwardly facing surface of said inner wall (i.e. convex ablative surface).

Preferably, said ablative surface has a circular or elliptical cross-section perpendicular to the axis of rotation of the or each rotatable surface, although it will be understood that other shaped sections are possible.

Preferably, said at least one rotatable surface is in the form of a rotatable blade.

Preferably, said heating means is adapted to heat said ablative surface from about 400° C. to about 700° C. Said heating means may be arranged to heat the ablative surface in any convenient manner, for example by electrical heating, by the combustion of a solid, liquid or gaseous fuel (e.g. by-product char or gas from the process) or condensation of a vapour, or by circulation of a hot fluid (e.g. molten sodium).

In a preferred series of embodiments the ablative surface is defined by the inwardly facing surface of the outer wall and the or each rotatable surface (e.g. blade) is mounted inwardly of the ablative surface (e.g. on a spindle) and arranged to press feedstock away from the axis of rotation.

In an alternative series of embodiments, the ablative surface is defined by the outwardly facing surface of the inner wall of the reaction vessel and the or each rotatable surface (e.g. blade) is mounted outwardly of the ablative surface and arranged to press feedstock toward the axis of rotation.

Preferably, means are provided to adjust the angle of the rotatable surface (or the front surface of each blade) relative to the ablative surface. More preferably angle adjustment means are provided to adjust each rotatable surface/blade independently.

Preferably, means are provided to adjust the spacing between each rotatable surface/blade and the ablative surface. More preferably spacing adjustment means are provided to adjust each rotatable surface/blade independently.

Preferably, the or each rotatable surface/blade is resiliently biased toward the ablative surface. Preferably, a plurality of rotatable surfaces/blades are provided, the rotatable surfaces/blades preferably being equi-angularly displaced about the axis of rotation.

Preferably, said ablative thermolysis reactor has a continuous feed mechanism for supplying feedstock into said reaction vessel.

Figure 3:
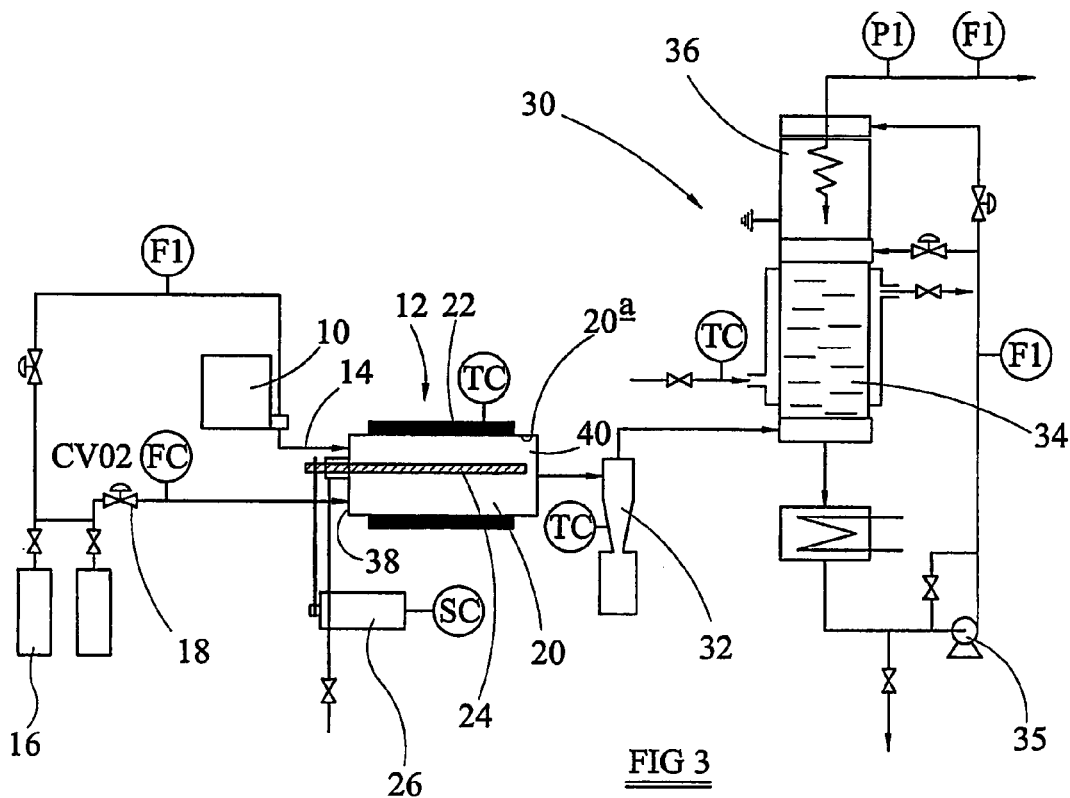
Figure 4:
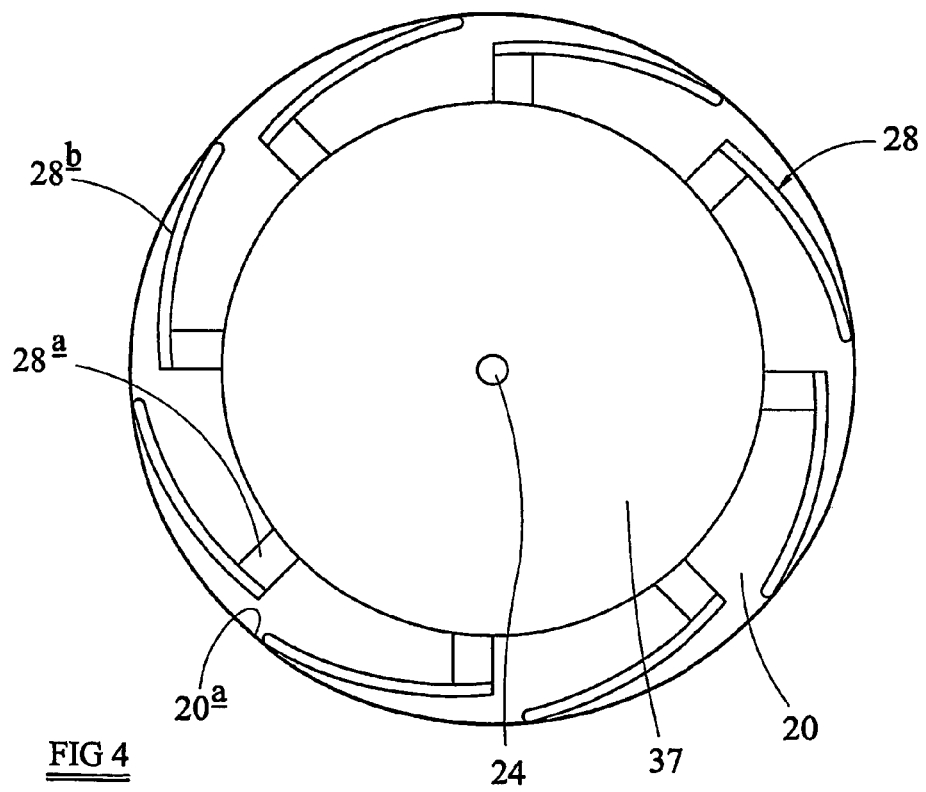
Figure 5:
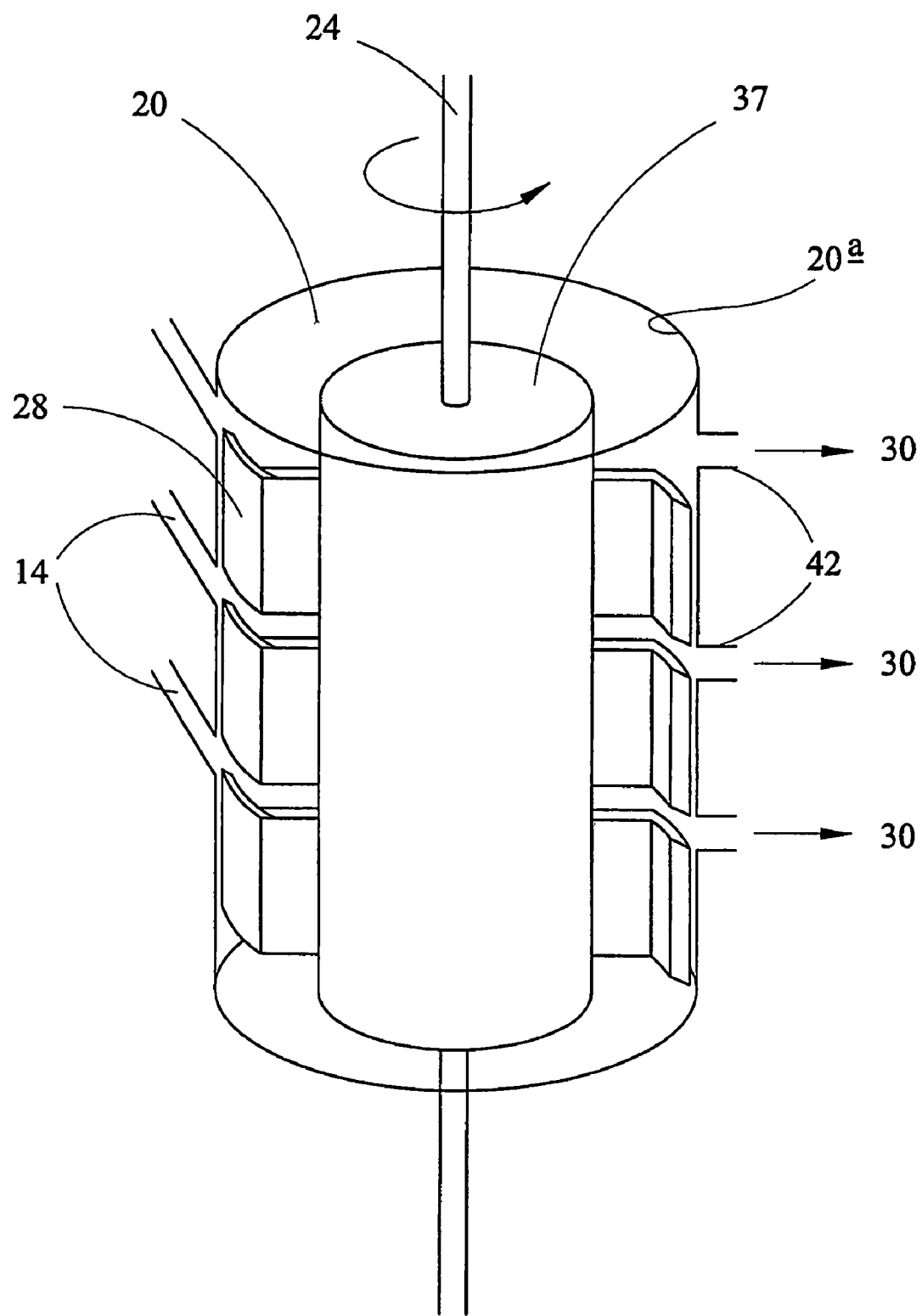

An embodiment of the present invention will now be described, by way of example only, with reference to the accompanying drawings in which:

FIG. 1 is a graphical representation of an ablative thermolysis reactor according to the prior art, FIG. 2 is a graphical representation of the action of a blade against the ablative surface of the ablative thermolysis reactor of FIG. 1, FIG. 3 is a schematic representation of an ablative thermolysis apparatus including an ablative thermolysis reactor according to the present invention, FIG. 4 is a cross sectional representation of the ablative thermolysis reactor shown in FIG. 3, perpendicular to the axis of rotation of the blades, and FIG. 5 is a graphical representation of part of another ablative thermolysis reactor according to the present invention.

Referring now to FIG. 3, an ablative thermolysis apparatus according to the present invention comprises a sealable feedstock feeder 10 connected to an ablative thermolysis reactor 12 via an inlet pipe 14. A nitrogen supply 16 is also connected to the ablative thermolysis reactor 12 and to the feedstock feeder 10, the supply rate of this nitrogen supply 16 to the reactor 12 being adjustable by a flow control valve 18. The ablative thermolysis reactor 12 comprises a sealable circular cylindrical reaction vessel 20, the internal wall of which defines an ablative surface 20a. An annular band heater 22 is mounted around and in contact with the reaction vessel 20 and arranged to heat the ablative surface 20a in use. The ablative thermolysis reactor 12 also has a central horizontally mounted drive shaft 24 which is driven by a variable speed motor 26. Blades 28 (described with reference to FIG. 4) are connected to the drive shaft 24. The ablative thermolysis apparatus further comprises a product collection system 30 downstream of the reactor 12. The product collection system 30 has a cyclone char collector 32 and a condenser 34 connected in series to the ablative thermolysis reactor 12. An electrostatic precipitation chamber 36 including a precipitation electrode (not shown) is provided downstream of the condenser 34 with a liquid recirculation pump 35 provided to return cooled pyrolysis liquids to the top of the precipitation chamber 36 to prevent accumulation of liquids on the precipitation electrode. The electrostatic precipitation chamber 36 is vented to the atmosphere via a gas flow meter.

The ablative thermolysis reactor 12 will now be described in more detail with reference to FIG. 4. The hollow cylindrical reaction vessel 20 has an internal diameter of 256 mm and a length of 130 mm. The internal concave wall of the reaction vessel forms the ablative surface 20a. An inner drum 37 having a diameter of 190 mm is mounted upon the drive shaft 24 which is in turn mounted on bearings (not shown) and connected to the variable speed drive motor 26. The axis of rotation of the drive shaft is coincident with the longitudinal axes of both the hollow cylinder forming the reaction vessel 20 and the inner drum 37. The inner drum 37 serves to reduce the vapour space inside the reactor thereby reducing the residence time of the products in the reactor 12. The drum 37 also provides a suitable surface on which to attach the blades 28. These are bolted to the inner drum 37 at 45° intervals such that there are eight equally spaced blades 28 positioned around the inner drum 37.

Each blade 28, which in this embodiment extends substantially the whole length of the reaction vessel 20, is mounted at a first end thereof onto the inner drum 37 via a support 28a. Each blade 28 has a free second end which is spaced from the internal wall of the reaction vessel 20 forming the ablative surface 20a by about 1 mm or less. Between its first and second ends each blade 28 has a curved front surface 28b. In this embodiment the blades 28 are permanently fixed at a predetermined angle to give a fixed clearance from the ablative surface 20a. In a modification of this embodiment (not shown), the blades are provided with calibration screws which allow for adjustment of the blade angle and/or clearance.

The cylindrical reaction vessel 20 has flanged regions (not shown) provided at both ends, and is sealable by means of front and back plates 38, 40 (FIG. 3) which can be attached by means of bolts to the flanged regions in conjunction with a shaft seal (not shown). In this embodiment, the shaft seal is a pressure seal maintained through the use of an air cooled seal housing containing an aluminum/bronze bush and a high temperature polymer seal. The plates 38, 40 also allow attachment of the reaction vessel 20 between the inlet pipe 14 from the feedstock feeder 10 and the product collection system 30. The drive shaft 24, the nitrogen gas supply 16 and the feedstock inlet 14 enter the reaction vessel 20 through the front plate 38, and the product gases and char exit to the product collection system 30 through the rear plate 40.

In use, the front surfaces 28b of the blades 28 are set to a predetermined position relative to the ablative surface 20a, and the reaction vessel 20 is sealed by attaching the front and rear plates 38, 40. The feedstock inlet pipe 14 and the nitrogen source 16 are connected to the front plate 38, and the material to be pyrolysed is placed in the feedstock feeder 10 which is also sealed. The product collection system 30 is connected to the rear plate 40, and the nitrogen flow control valve 18 is set to the required rate. The whole ablative thermolysis apparatus is then purged with nitrogen to provide a non-reactive atmosphere to prevent unwanted oxidation of the wood chip feedstock. The band heater 22 is set to the desired temperature (e.g. ≈600° C.) and the ablative surface 20a, the reaction vessel 20 and the blades 28 are allowed to equilibrate to that temperature. The variable speed motor 26 is set to the required speed and the drive shaft 24, the inner drum 37 and the blades 28 rotated (the blades 28 thereby constituting rotatable moving surfaces). Wood chip is then continuously fed into the reaction vessel 20 from the feedstock feeder 10 using a feed screw with gravity feed into the reactor 12. The woodchip is pressed against and moved along the ablative surface 20a, where it is rapidly pyrolysed between the front surfaces 28b of blades 28 and the ablative surface 20a in a similar manner to that illustrated in FIG. 2.

A slight positive pressure is generated by the formation of vapour and gas products and this forces the same products out of the reaction vessel 20 into the collection system 30. In the product collection system 30 the char is separated from the gases and vapours by the vortex generated in the cyclone char collector 32 and the gaseous pyrolytic product is condensed in the condenser 34 to give a liquid which is collected for use as a fuel or as a source of chemicals. Any uncondensed gases and vapours pass into the electrostatic precipitation chamber 36 where they meet the cooled liquid recirculating through the liquid recirculation pump 35 and any remaining product is collected. The remaining non-condensable gases ($CO$, $CO_2$, $CH_4$, $H_2$ and higher hydrocarbons) are vented via the gas flow meter.

A further embodiment of a thermolytic reactor according to the present invention particularly suited to large scale applications is shown in FIG. 5. In this embodiment a plurality of blades 28 are axially spaced along the length of the inner drum 37. In addition, a plurality of feedstock pipes 14 are provided at spaced intervals along the length of vessel 20. A corresponding number of thermolysis gas/vapour outlets 42 are provided on the opposite side of the vessel 20 (i.e. angularly spaced by 180° from the inlet pipes 14). The inlet pipes 14 and the gas/vapour outlets 42 are positioned to deposit or withdraw material, into or out of the reaction vessel 20 respectively, in the spacings between adjacent pairs of axially spaced blades 28. In this embodiment the reaction vessel 20 is positioned vertically such that the respective feedstock inlet pipes 14 enter the vessel 20 above the position of one of the axially spaced blades 28. In a modification of this embodiment the blades 28 are axially staggered along the length of the reaction vessel 20 and are overlapping to ensure that the whole ablative surface 20a is swept by the blades 28.

Further embodiments of the thermolytic reactor according to the present invention can be envisaged in which the outer surface of the inner drum forms the ablative surface, and the blades are connected to a rotatable peripheral reaction vessel wall.

The invention claimed is:

1. An ablative thermolysis reactor comprising: (i) a reaction vessel, (ii) an inlet into the reaction vessel for receiving feedstock, (iii) an outlet from the reaction vessel for discharging thermolysis product, (iv) within the reaction vessel, an ablative surface defining the periphery of a cylinder, (v) heating means arranged to heat said ablative surface to an elevated temperature, and (vi) at least one rotatable surface, the, or each, rotatable surface having an axis of rotation coincident with the longitudinal axis of said cylinder, wherein the rotatable surface is positioned relative to the ablative surface such that feedstock is mechanically pressed between a part of the rotatable surface and said ablative surface and moved along the ablative surface by the rotatable surface, whereby to thermolyze said feedstock, and wherein the reaction vessel is bounded by an outer peripheral wall with the ablative surface being defined by an inwardly facing surface of said outer wall, and the, or each, rotatable surface is mounted inwardly of the ablative surface and arranged to rress feedstock away from the axis of rotation.

2. An ablative thermolysis reactor comprising: (i) a reaction vessel, (ii) an inlet into the reaction vessel for receiving feedstock, (iii) an outlet from the reaction vessel for discharging thermolysis product, (iv) within the reaction vessel, an ablative surface defining the periphery of a cylinder, (v) heating means arranged to heat said ablative surface to an elevated temperature, and (vi) at least one rotatable surface, the, or each, rotatable surface having an axis of rotation coincident with the longitudinal axis of said cylinder, wherein the rotatable surface is positioned relative to the ablative surface such that feedstock is mechanically pressed between a part of the rotatable surface and said ablative surface and moved along the ablative surface by the rotatable surface, whereby to thermolyze said feedstock, and, wherein the reaction vessel is bounded by an inner wall with the ablative surface being defined by an outwardly facing surface of said inner walk, and wherein the, or each, rotatable surface is mounted outwardly of the ablative surface and arranged to press feedstock toward the axis of rotation.

3. A reactor as claimed in claim 1, wherein said ablative surface has a circular or elliptical cross-section perpendicular to the axis of rotation of the, or each, rotatable surface.

4. A reactor as claimed in claim 1, wherein said at least one rotatable surface is in the form of a rotatable blade.

5. A reactor as claimed in claim 1, wherein said heating means is adapted to heat said ablative surface to a temperature in the range of from about 400° C. to about 700°.

6. A reactor as claimed in claim 4, wherein said heating means is arranged to heat the ablative surface by electrical heating, by the combustion of a solid, liquid or gaseous fuel, by condensation of a vapour, or by circulation of a hot fluid.

7. A reactor as claimed in claim 1, wherein means are provided to adjust the angle of the rotatable surface, or front surface of each blade when present, relative to the ablative surface.

8. A reactor as claimed in claim 7, wherein angle adjustment means are provided to adjust independently each rotatable surface or blade when present.

9. A reactor as claimed in claim 1, wherein means are provided to adjust the spacing between each rotatable surface and the ablative surface.

10. A reactor as claimed in claim 1, wherein the, or each, rotatable surface is resiliently biased toward the ablative surface.

11. A reactor as claimed in claim 1, wherein a plurality of rotatable surfaces are provided, the rotatable surfaces preferably being equi-angularly displaced about the axis of rotation.

12. A reactor as claimed in claim 1, wherein said reactor is provided with a continuous feed mechanism for supplying feedstock into said reaction vessel.

* * * * *

UNITED STATES PATENT AND TRADEMARK OFFICE
CERTIFICATE OF CORRECTION

PATENT NO. : 7,625,532 B2
APPLICATION NO. : 10/501025
DATED : December 1, 2009
INVENTOR(S) : Bridgwater et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1242 days.

Signed and Sealed this

Second Day of November, 2010

David J. Kappos
*Director of the United States Patent and Trademark Office*